US006601183B1

(12) United States Patent
Larson et al.

(10) Patent No.: US 6,601,183 B1
(45) Date of Patent: Jul. 29, 2003

(54) DIAGNOSTIC SYSTEM AND METHOD FOR A HIGHLY SCALABLE COMPUTING SYSTEM

(75) Inventors: Mark Larson, Eau Claire, WI (US); Richard T. Ingebritson, Bloomer, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,438

(22) Filed: Sep. 30, 1999

(51) Int. Cl.[7] .............................................. G06F 11/00
(52) U.S. Cl. ........................................... 714/4; 714/31
(58) Field of Search ............................. 714/46, 47, 48, 714/39, 42, 31, 25, 30, 27, 32, 57, 36

(56) References Cited

U.S. PATENT DOCUMENTS

| | | | | |
|---|---|---|---|---|
| 5,047,917 A | * | 9/1991 | Athas et al. ................. 364/200 |
| 5,325,518 A | * | 6/1994 | Bianchini, Jr. ............... 395/575 |
| 5,421,004 A | * | 5/1995 | Carpenter et al. ........... 371/15.1 |
| 5,488,728 A | * | 1/1996 | Dreyer ........................ 395/726 |
| 5,671,356 A | * | 9/1997 | Wang .................... 395/200.03 |
| 5,684,807 A | * | 11/1997 | Bianchini, Jr. et al. ..... 371/20.1 |
| 5,758,065 A | * | 5/1998 | Reams et al. ........... 395/185.01 |
| 5,983,366 A | * | 11/1999 | King ....................... 395/183.14 |
| 6,041,287 A | * | 3/2000 | Dister et al. ................. 702/182 |
| 6,122,756 A | * | 9/2000 | Baxter et al. .................. 714/30 |
| 6,237,114 B1 | * | 5/2001 | Wookey et al. ................ 714/47 |

* cited by examiner

Primary Examiner—Nadeem Iqbal
(74) Attorney, Agent, or Firm—Staas & Halsey LLP

(57) ABSTRACT

Diagnostic environments designed for ccNUMA computing systems require different capabilities than conventional diagnostic programs. Since most conventional operating systems do not permit sufficient access to hardware by application programs, a diagnostic microkernal is distributed to all of the processors of all of the nodes of the computing system. Instead of dumping output to a user interface, diagnostic programs executing under control of the diagnostic microkernal store formatted data in shared memory. A shell process executing at an interface node is notified of errors and informs the user who selects the formatted data in shared memory to be accessed by the shell process for output via a user interface by little more than echoing the data. Either a dumb terminal or a desktop computer or workstation which adds further formatting capabilities may be used for display of the data.

20 Claims, 4 Drawing Sheets

DIAGNOSTIC SYSTEM AND METHOD FOR A HIGHLY SCALABLE COMPUTING SYSTEM

BACKGROUND OF THE INVENTION

1. Field of the Invention

This invention relates generally to computer system diagnostics and, more particularly, to diagnostic processing in massively parallel computing systems.

2. Description of the Related Art

Although it is less common in recent years, diagnostic programs or applications are often provided to purchasers of computer systems. The capabilities and ease of use of these diagnostic programs vary with the type and manufacturer of the computer. Diagnostic programs for desktop computers and workstations typically have a relatively easy to use interface, and are often limited in capability. On the other hand, diagnostic programs for mainframe computers and supercomputers may have much greater diagnostic capabilities, but often are also much more difficult to use. As a result, such programs are sometimes used only by service personnel hired by the manufacturer.

The development of diagnostic programs has become increasingly difficult as the use of multiprocessor computer systems has become more common, particularly scalable computer systems such as cache coherent non-uniform memory access (ccNUMA) systems. Operating systems of such systems are designed to insulate users from functions they perform, such as task distribution and load balancing, while diagnostic systems must do the exact opposite, i.e., inform the user of what portion of the computer system is being used. Diagnostic systems are required to access physical memory and privileged kernel space, and certain machine instructions have to be in kernel mode to execute on a processor. As a result, the ordinary operating system cannot be used to run full diagnostic software on scalable computing systems that can be used to implement a ccNUMA computing system. If the diagnostic software is designed to be used by people who are not employees of the computer manufacturer, powerful diagnostic capabilities must be accompanied by a user interface that is easy to use.

SUMMARY OF THE INVENTION

It is an object of the present invention to provide user control of diagnostic processing results in a diagnostic environment for a highly scalable computer system.

It is another object of the present invention to provide efficient processing of diagnostic programs on a ccNUMA computing system.

It is an additional object of the present invention to provide a flexible diagnostic environment for a ccNUMA computing system that supports both simple and sophisticated user interfaces and diagnostic tasks initiated and executing in different ways.

To achieve these objects, the present invention provides a method of executing diagnostic programs on a multi-node computer system, including executing a shell process at an interface node to provide a user interface; storing diagnostic data, generated by execution of diagnostic programs under control of a diagnostic microkernel at each of the nodes, in memory locations accessible by the diagnostic microkernel and the shell process; and accessing the diagnostic data by the shell process to output data in response to instructions received via the user interface. When each node of the multi-node computer system includes a plurality of processors, a thread of the diagnostic microkernel is initialized in each of the processors in each node.

Preferably, the shell process and diagnostic microkernel support both a message passing protocol and memory sharing for communication between the nodes. The diagnostic microkernel may be initialized at each of the nodes with instructions required for managing diagnostic processing and resources locally at the node and communication between the nodes may be accomplished using shared memory. Alternatively, the diagnostic microkernel may be initialized at each of the nodes with all instructions and data required for managing diagnostic processing and resources locally at the node, with communication between the nodes accomplished using message passing.

Diagnostic programs executing in a diagnostic operating environment according to the present invention preferably produce formatted data for output in response to instructions from the user interface and the shell process echoes the formatted data via the user interface under control of the user. This enables diagnostic threads to execute in a plurality of the nodes, where the threads perform identical diagnostic operations at each of the nodes without overwhelming the user interface with the results of the diagnostic processing.

These together with other objects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
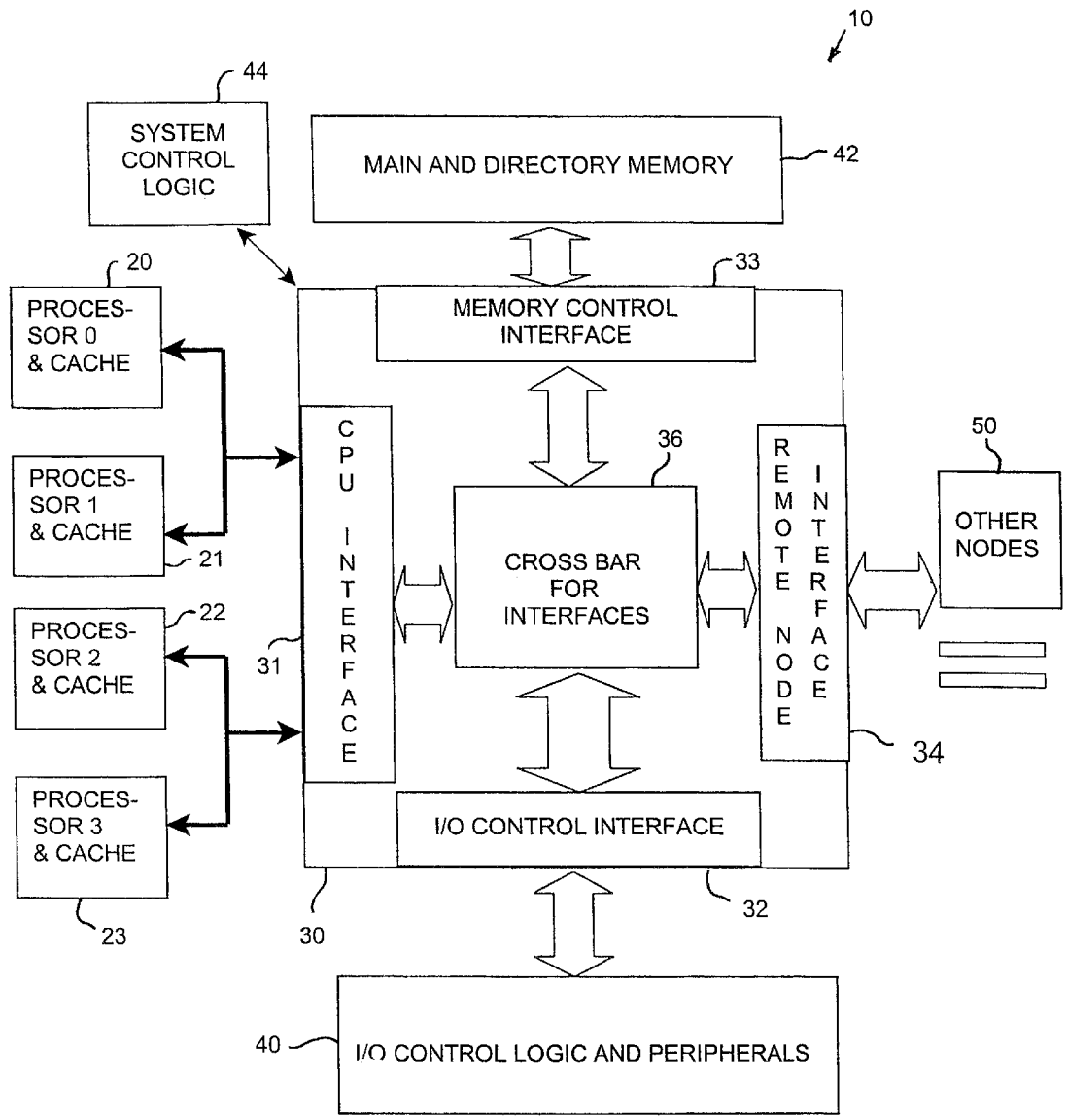
FIG. 1 is a block diagram of a single node in a highly scalable computing system to which the present invention can be applied.

An example of a processing node in a scalable computing system to which the present invention can be applied is illustrated in FIG. 1. In this example, four processors 20–23, including cache memory, are coupled to bedrock components 30. The bedrock components include four interfaces 31–34 and a cross bar 36 connecting the interfaces. CPU interface 31 is coupled to the processors 20–23. Input/output control interface 32 is connected to input/output control logic and peripherals 40. Memory control interface 33 is connected to main and directory memory 42. System control logic 44 provides control of the bedrock components 30. Remote node interface 34 provides a connection to other nodes 50.

In the hardware illustrated in FIG. 1, memory errors are detected by the bedrock control chip 44 which sets a bit in an interrupt printing register and sends an interrupt to one of the processors 20–23 The processor handles the interrupt in a conventional manner by stopping execution, setting its program to look for an entry point on an exception vector and causing the diagnostic microkernel to process the interrupt based on the exception vector. The above description is provided as an example only. The present invention is not limited to any particular hardware design or configuration and details of how errors are handled will vary depending upon the hardware that is operating in a diagnostic environment according to the present invention.

Operating systems for multiprocessor nodes like the node illustrated in FIG. 1 are known in the art. However, as described above, the techniques used for operating systems to execute user programs must be modified for diagnostic processing, so that the diagnostic programs have the required level of access to hardware components and information regarding the specific hardware components being used to enable proper diagnostic operations to be performed. In the preferred embodiment, this is accomplished by initializing a diagnostic microkernel at each of the nodes, with a thread executing on each of the processors. The diagnostic microkernel is preferably distributed from a single node referred to herein as an interface node and typically designated node 0. The diagnostic microkernel includes the instructions required to manage the resources in the node in support of diagnostic programs, as described below.

Figure 2:
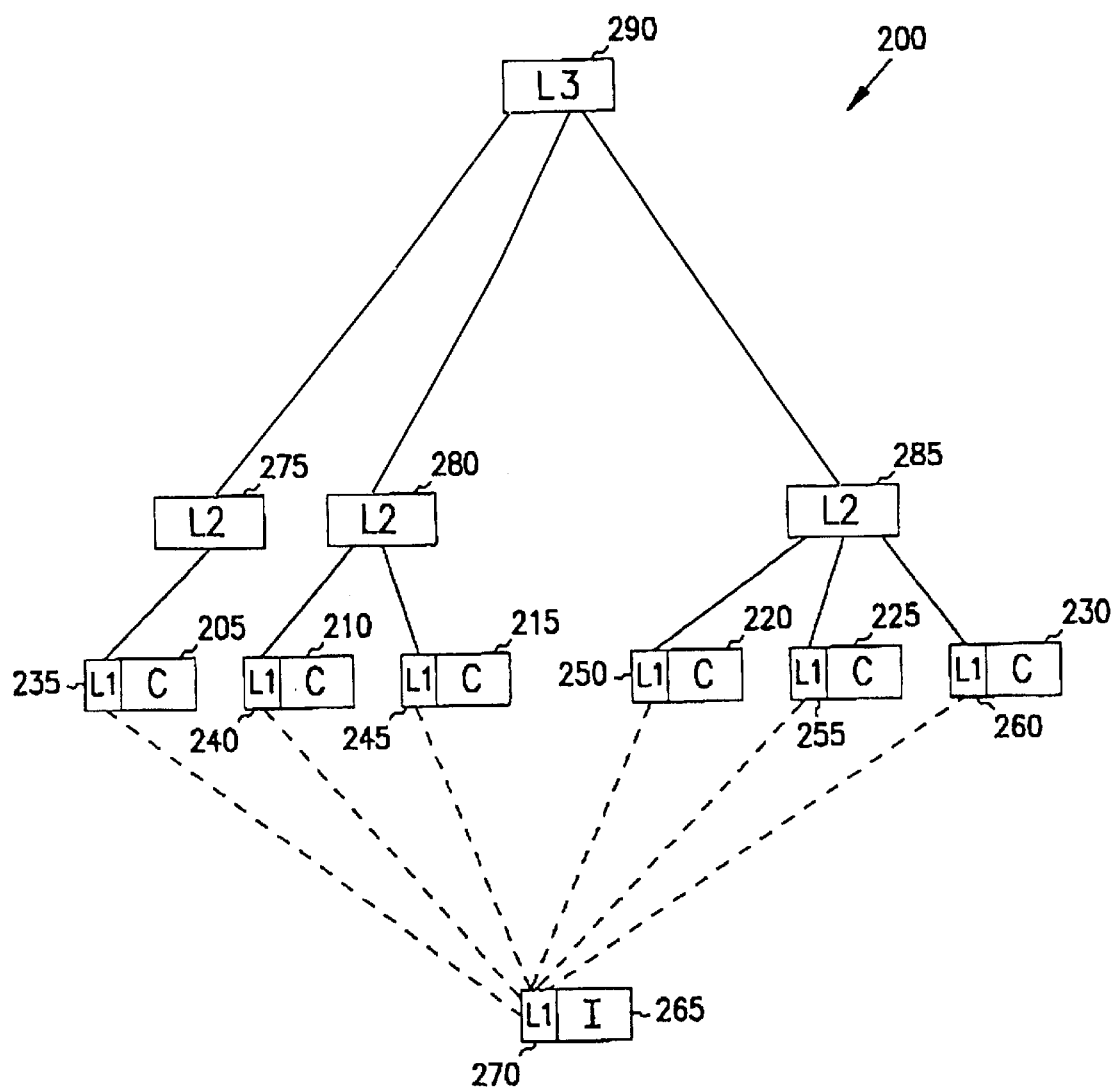
FIG. 2 is a block diagram of an example of a simple computing system to which the present invention can be applied.

Illustrated in FIG. 2 is an example of a multi-node computing system 200 having processor nodes 205, 210, 215, 220, 225 and 230 constructed like the node illustrated in FIG. 1. The system control logic 44 (FIG. 1) in each node is indicated in FIG. 2 by reference numerals 235, 240, 245, 250, 255, 260 respectively corresponding to the processor nodes 205, 210, 215, 220, 225 and 230. The system control logic 235, 240, 245, 250, 255, 260 provides hierarchical management of the system illustrated in FIG. 2 as described below.

In the system illustrated in FIG. 2, all of the processor nodes 205–230 have access to an input/output node 265. As illustrated in FIG. 2, the input/output unit 265 may be considered as existing at the same level of hierarchy as the processing units and thus, its corresponding system control unit 270 is identified as level L1 in the same manner as the processing unit.

One or more upper level units may be used to manage the processing units. In FIG. 2, three units 275, 280, 285 are illustrated at level L2 and one unit 290 is illustrated at level L3. However, it should be understood that the total number of processing units in a system having two levels of management may be much larger than the number illustrated in FIG. 2 which is simplified for purposes of description. The present invention is designed to be used with highly scalable computing systems that may have hundreds of processors.

Figure 3:
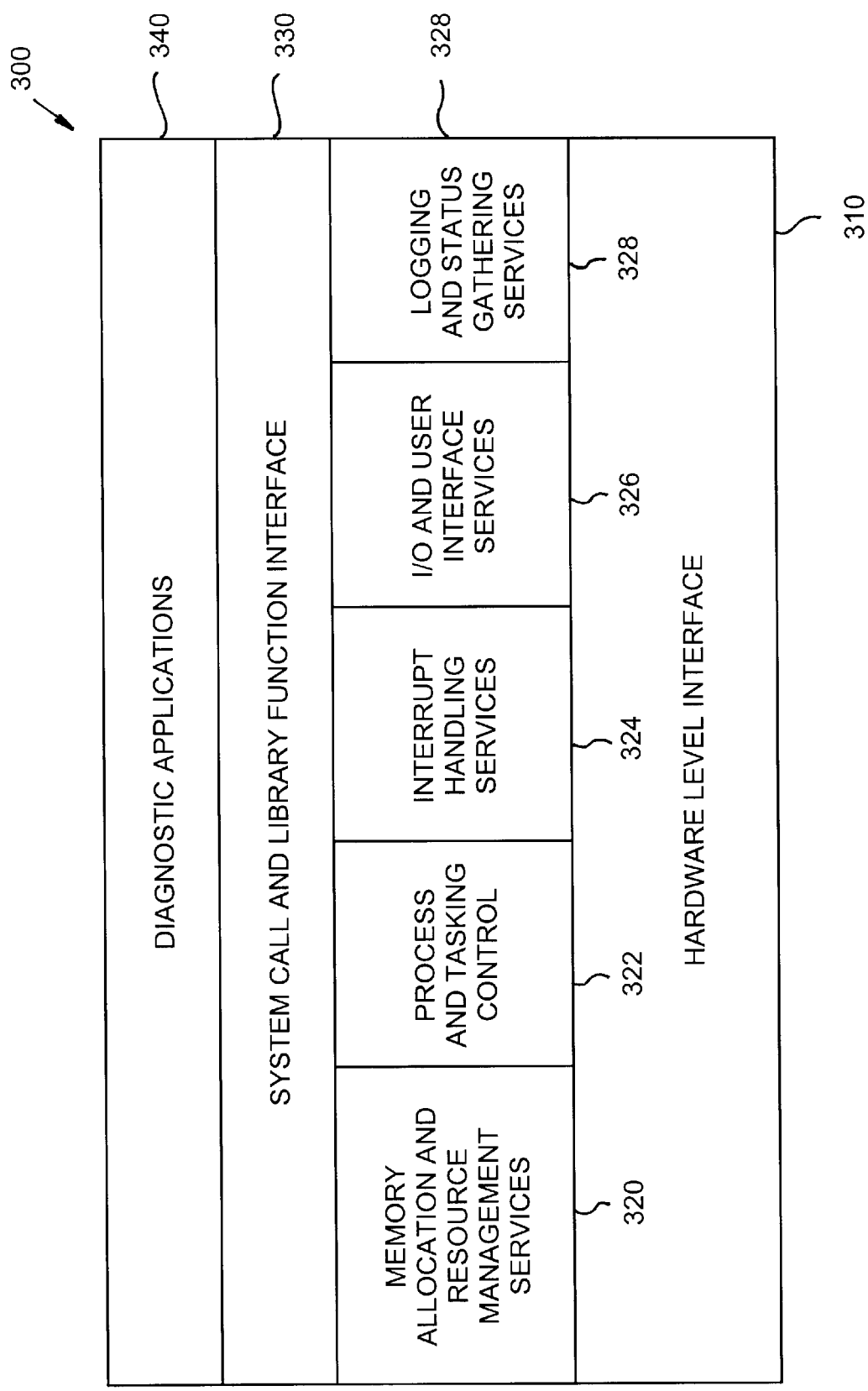
FIG. 3 is a program structure diagram of a diagnostic operating environment according to the present invention.

A conceptual block diagram of the diagnostic operating environment 300 is illustrated in FIG. 3. The hardware level interface 310 includes the hardware specific code required to execute on the specific hardware in the computing system. System level functions 320, 322, 324, 326, 328 operate as peer entities having equal priority. These functions include memory allocation and resource management services 320, process and tasking control 322, interrupt handling services 324, input/output and user interface services 326 and logging and status gathering services 328. On top of these services is an interface 330 of system calls and library functions which are used by diagnostic applications 340 to access the services 320–328.

Memory allocation and resource management services 320 provide access to physical memory. For example, in the system illustrated in FIGS. 1 and 2, physical memory may be represented by a "page table" on the node where the physical memory resides. A page table is basically a single large bit map where one bit corresponding to a 4 k page indicates what physical pages are available and where they are located. When a diagnostic application requests a physical memory segment, the memory allocation and resource management services 320 search the page table for a segment large enough to fulfill the request, clear the corresponding bits, then record what segment was reserved in a "segment table". The segment table is a linearly searched list of reserved physical addresses that are associated with the process that requested them. The physical segments are released when the diagnostic application makes a system call to release them, or when the diagnostic application terminates.

There are two ways for a diagnostic application to ask for memory. The first is to ask for physical memory, in which case the corresponding segment table just holds the physical segment information, i.e., base address, size, etc. The second is to ask for a virtual segment, in which case a physical segment is mapped to a virtual address. The virtual address is also kept in the segment table so that the diagnostic microkernel can use the entry to update the address translation look-ahead buffer (tlb) when a "tlb miss" occurs. Segment tables are created whenever a process with it's own data and text segments are created. Threads share the parent's segment table. In short, there is a page table for every node, and a segment table for every process or process group.

According to the present invention the memory allocation and resource management services 320 include instructions executing on each of the processors of the system to support storing data in main memory 42 shared by the nodes. As the diagnostic programs (described in more detail below) execute, the results of their processing are sent to the shared memory by the memory allocation and resource management services 320. When errors are detected, an interrupt is generated for the interface node (node zero) for the user interface. The user can then select an error condition to investigate, or review the status of the diagnostic processing.

In the preferred embodiment, the user is able to select between use of a fork command and a sproc command to initiate execution of the diagnostic microkernel. Conventionally, the term "fork command" is used to describe initiation of a process by making a complete copy of code and data segments, so that a completely independent process executes at each of the nodes. The term "sproc command" is used to refer to the creation of a thread that shares code and data. In the case of the present invention, a fork command is preferably used where the nodes have sufficient capacity to store all of the code and data segments required, so that execution at each of the nodes is completely independent of other nodes. Provision is made for use of a sproc command which is useful in situations such as when the nodes have less capacity and can more efficiently run diagnostic programs by loading only a portion of the diagnostic microkernel at a time and loading additional microkernel segments from a memory shared with other nodes.

Figure 4:
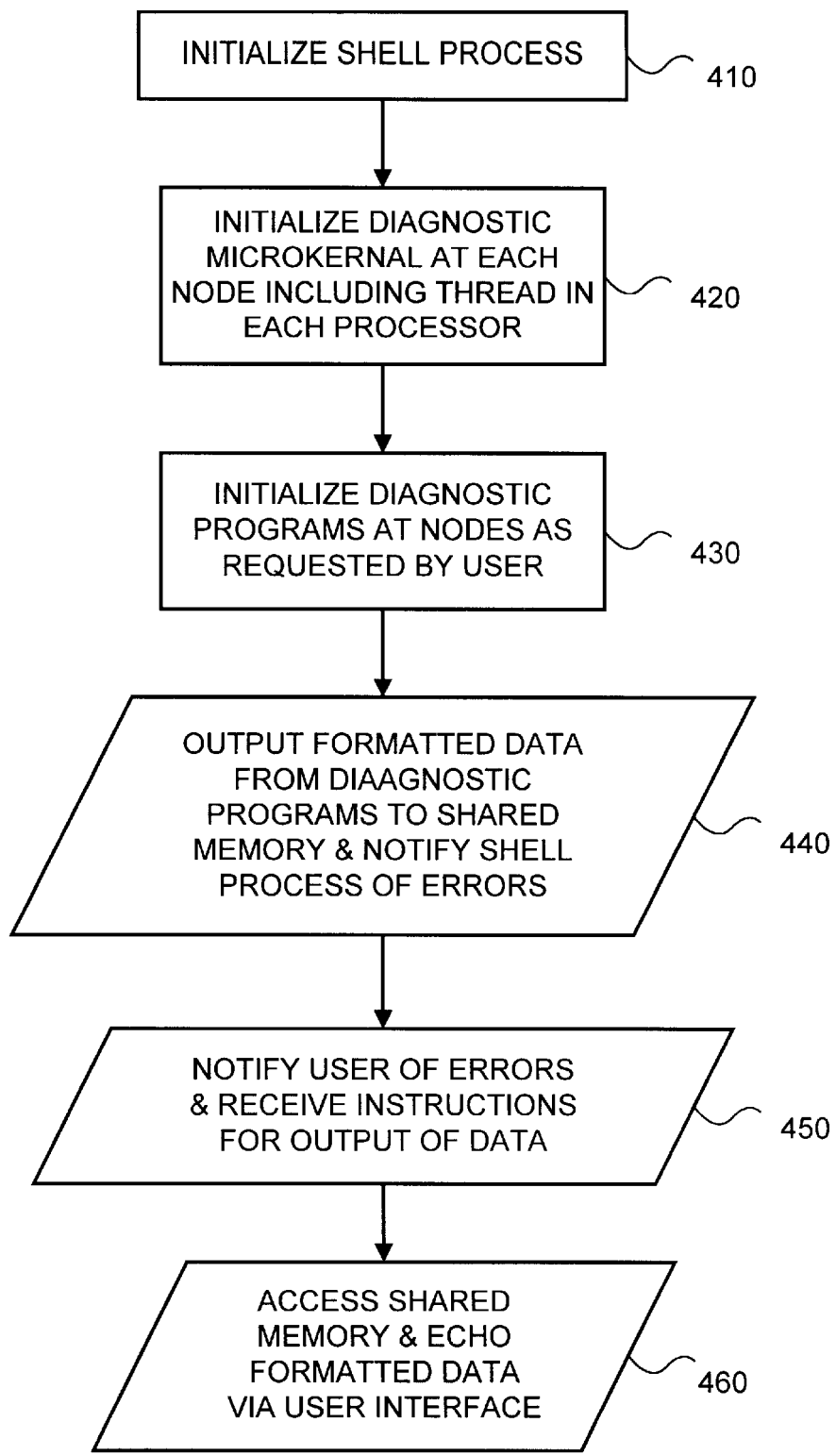
FIG. 4 is a flowchart of a method according to the present invention.

A flowchart of an method according to the present invention is illustrated in FIG. 4. A shell process is initialized 410 and executed at the interface node, node 0. One function the shell process can perform is initialization 420, 430 of processes at the other nodes. In a preferred embodiment of the invention, the diagnostic microkernel is distributed from node 0 to each of the other nodes. If this is accomplished by a write instruction in the shell process, ideally the diagnostic microkernel will be small enough to fit in the cache memory of node 0, so that a fork command may be used to transfer the diagnostic microkernel from the cache memory of node

0 to each of the nodes. After the diagnostic microkernal is completely written to a node, the shell process makes a system call to the firmware of the node to provide the primary processor 20 (FIG. 1) with the address at which to start execution. The primary processor 20 then starts up the kernal threads on the other three processors 21–23.

Alternatively, a read process could be used instead of a write process. For example, if the cache memory will not hold all of the diagnostic microkernal, the diagnostic microkernal can be stored in shared memory accessible by all of the nodes and a small segment of program code can be sent to each of the nodes to read the diagnostic microkernal from the shared memory and begin execution as described above.

There are many possible diagnostic applications 340 (FIG. 3) that could be run in a diagnostic environment according to the present invention. When executed, each diagnostic program, including instructions and data, is distributed across each node within the system using system calls and shared memory communication mechanisms to coordinate activities between the processes on each node. System calls in library functions 330 are used to format the execution results for display. Memory allocation and resource management services 320 control the starting and stopping of threads and processes of each of the programs described below.

One example of a diagnostic program is a multiple process application, herein referred to as NMEM, for testing and verifying the data path from processors 20–23 to and from main memory (e.g., DIMMs) included in main and directory memory 42, error correction logic of the bedrock control unit 44 related to use of the main memory and operation of specialized "atomic operations" which can be performed on memory. The term "atomic operations" refers to operations that involve multiple instructions or multiple functions that execute in an uninterruptible manner using special logic in the computer system.

Another multiple process application, referred to herein as NDIR, which performs testing and verifying of the data path between the processors 20–23 and the directory memory included in main and directory memory 42, the data retention capabilities of the directory memory and the error correction logic of the system control unit 44 related to use of the directory memory like NMEM, NDIR is distributed over all of the processors.

Another multiple process application, herein referred to as SCCT, has the purpose of testing the cache coherency logic of the nodes, both local cache and remote (internode) shared, cacheable memory transactions. SCCT contains a collection of algorithms that produce end case conflict conditions, over subscribe buffer space, challenge forward progress and attempt to create deadlock conditions. Uncached, shared memory locations are used for interprocess communication and synchronization of the SCCT threads executing simultaneously on multiple processors.

A large multi-threaded, multiprocess application, herein referred to as SLT, generates large amounts of random data transactions, functional mixes, target addresses and input/output activity, all of which are intended to induce possible end case hardware faults in the system. Four main types of traffic generating processes are used, together with a random access generator, random data generator, random input/output transfers and a block transfer engine. Any processor in any node may be executing one or more of these processes at any given time.

Another multiple process application, herein referred to as BARR, includes one process active in each of the processors 20–23 in each of the nodes of the system. The purpose of BARR is to test the special hardware state machines and associated control registers which provide hardware based synchronization mechanisms (referred to as "barriers"). The software is allowed to use control registers to enable or disable any node or processor as a participating member of a barrier circuit. All combinations of such configurations are verified. Memory based atomic synchronization operations between each hardware based barrier synchronization ensure that the proper state is achieved at each node and processor.

Another multiple process application, herein referred to as RTRB, also includes one process active in each processor 20–23 at each of the nodes 10 of the system. The purpose of RTRB is to test the base internal functionality of an internode network control chip (not shown in FIG. 1). Tests include control register access (both write and read), vector (special) packet routing, normal table driven packet routing and port and intermodule link operations.

Another multi-threaded multiprocess application, herein referred to as RTRF, generates large amounts of random intermodule transactions. The purpose of RTRF is to look for end case hardware faults of the router chip. Several traffic patterns between target nodes are used to cause stress at router ports, such as having a plurality of source of nodes target a signal destination node, each such node target a unique destination node, or each source node target all nodes, as well as random target node selection.

Another example of a diagnostic application is testing of input/output control boxes external to the nodes using a program referred to as XBG to test input/output control interface logic. XBG initializes a process by what is commonly referred to as a "fork" to produce the instructions and data of the process of each node that has an attached input/output control box. Two types of testing are performed by XBG to verify the basic internal operation of the main control chip with the input/output control box and to input and output data transfers to networking devices that the input/output box controls.

In the preferred embodiment the diagnostic programs store 440 data formatted for output in shared memory which is provided by the main memory 42 in the processor nodes 10. The shell process is notified 440 of errors by the diagnostic programs or the bedrock control chip 44, as described above. When the shell process executing at the interface node is notified of errors, the user is presented 450 with screens providing options for display of information related to the errors. Preferably, the shell process is able to provide the data to either a dumb terminal or a more sophisticated device, such as a desktop computer or workstation which can further format the data. In the case of a dumb terminal, the shell process includes control codes for controlling display of the data which are either not supplied to the desktop computer, or are interpreted by a separate program executing on the desktop computer as codes separating portions of data. In the preferred embodiment, the formatting required by the shell process is kept to a minimum by having the diagnostic programs format the data for easy display to the user. Any conventional technique for formatting data can be used that is known in the art, but a significant benefit is provided by having the diagnostic programs perform most of the formatting and the program executing on the desktop computer perform additional formatting if necessary, so that the functions performed by the shell process are minimized. Essentially, the shell process merely echoes the data by transferring 460 from the shared memory to the output device.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of executing diagnostic programs on a multi-node computer system, comprising:
   executing a shell process at an interface n ode to provide a user interface;
   storing diagnostic data, generated by execution of diagnostic programs under control of a diagnostic microkernal at each of the nodes, in memory locations accessible by the diagnostic microkernal and the shell process; and
   accessing the diagnostic data by the shell process to output data in response to instructions received via the user interface.

2. A method as recited in claim 1, further comprising initializing the diagnostic microkernal at each of the nodes with all instructions and data required for managing diagnostic processing and resources locally at the node.

3. A method as recited in claim 2, wherein each node of the multi-node computer system includes a plurality of processors, and
   wherein said initializing includes initializing a thread of the diagnostic microkernal in each of the processors in each node.

4. A method as recited in claim 1, wherein the shell process and diagnostic microkernal support both a message passing protocol and memory sharing for communication between the nodes.

5. A method as recited in claim 4, further comprising:
   initializing the diagnostic microkernal at each of the nodes with instructions required for managing diagnostic processing and resources locally at the node; and
   communicating between the nodes by sharing memory.

6. A method as recited in claim 4, further comprising:
   initializing the diagnostic microkernal at each of the nodes with instructions and data required for managing diagnostic processing and resources locally at the node; and
   communicating between the nodes by passing messages.

7. A method of executing diagnostic programs on a multi-node computer system, comprising:
   executing a shell process at an interface node to provide a user interface and initialize execution of a diagnostic microkernal at all nodes of the multi-node computer system;
   executing at least one diagnostic program in response to instructions received via the user interface;
   storing diagnostic data, generated by execution of the diagnostic programs under control of the diagnostic microkernal at each of the nodes, in memory locations accessible by the diagnostic microkernal and the shell process; and
   accessing the diagnostic data by the shell process to output data in response to instructions received via the user interface.

8. A method as recited in claim 7,
   wherein said executing of at least one diagnostic program includes producing formatted data for output in response to an instruction from the user interface, and
   wherein said executing of the shell process includes echoing the formatted data via the user interface.

9. A method as recited in claim 7, wherein said executing of at least one diagnostic program includes executing a plurality of threads in a plurality of the nodes, the threads including copies of instructions and data for performing identical diagnostic operations at each of the plurality of nodes.

10. A diagnostic system for a multi-node computing system, comprising:
    an interface node executing a shell process to provide a user interface; and
    a plurality of nodes, each storing diagnostic data generated by execution of diagnostic programs under control of a diagnostic microkernal, in memory locations accessible by the diagnostic microkernal and the shell process, the shell process accessing the diagnostic data to output data in response to instructions received via the user interface.

11. A diagnostic system as recited in claim 10,
    wherein each of said nodes of the multi-node computer system includes a plurality of processors, and
    wherein the diagnostic microkernal is initialized at each of said nodes with all instructions and data required for managing diagnostic processing and resources locally and a thread of the diagnostic microkernal is initialized in each of the processors in each node.

12. A computer-readable storage containing instructions to control a computer to perform a method comprising:
    executing a shell process at an interface node to provide a user interface;
    storing diagnostic data, generated by execution of diagnostic programs under control of a diagnostic microkernal at each of the nodes, in memory locations accessible by the diagnostic microkernal and the shell process; and
    accessing the diagnostic data by the shell process to output data in response to instructions received via the user interface.

13. A computer-readable storage as recited in claim 12, further comprising initializing the diagnostic microkernal at each of the nodes with all instructions and data required for managing diagnostic processing and resources locally at the node.

14. A computer-readable storage as recited in claim 13, wherein each node of the multi-node computer system includes a plurality of processors, and
    wherein said initializing includes initializing a thread of the diagnostic microkernal in each of the processors in each node.

15. A computer-readable storage as recited in claim 13, wherein the shell process and diagnostic microkernal support both a message passing protocol and memory sharing for communication between the nodes.

16. A computer-readable storage as recited in claim 15, further comprising:
    initializing the diagnostic microkernal at each of the nodes with instructions required for managing diagnostic processing and resources locally at the node; and
    communicating between the nodes by sharing memory.

17. A computer-readable storage as recited in claim 15, further comprising:

initializing the diagnostic microkernel at each of the nodes with instructions and data required for managing diagnostic processing and resources locally at the node; and communicating between the nodes by passing messages.

18. A computer-readable storage containing instructions to control a computer to perform a method comprising:

executing a shell process at an interface node to provide a user interface and initialize execution of a diagnostic microkernel at all nodes of the multi-node computer system;

executing at least one diagnostic program in response to instructions received via the user interface;

storing diagnostic data, generated by execution of the diagnostic programs under control of the diagnostic microkernel at each of the nodes, in memory locations accessible by the diagnostic microkernel and the shell process; and accessing the diagnostic data by the shell process to output data in response to instructions received via the user interface.

19. A computer-readable storage as recited in claim 18, wherein said executing of at least one diagnostic program includes producing formatted data for output in response to an instruction from the user interface, and wherein said executing of the shell process includes echoing the formatted data via the user interface.

20. A computer-readable storage as recited in claim 18, wherein said executing of at least one diagnostic program includes executing a plurality of threads in a plurality of the nodes, the threads including copies of instructions and data for performing identical diagnostic operations at each of the plurality of nodes.

* * * * *